United States Patent [19]

Ikeura

[11] Patent Number: 5,195,470
[45] Date of Patent: Mar. 23, 1993

[54] VARIABLE CAM ENGINE

[75] Inventor: Kenji Ikeura, Yokohama, Japan

[73] Assignee: Nissan Motor Co., Ltd., Yokohama, Japan

[21] Appl. No.: 797,945

[22] Filed: Nov. 26, 1991

[30] Foreign Application Priority Data

Nov. 26, 1990 [JP] Japan ................ 2-321679

[51] Int. Cl.⁵ .................................. F01L 1/34
[52] U.S. Cl. .......................... 123/90.15; 123/90.16
[58] Field of Search ............... 123/90.15, 90.16, 436

[56] References Cited

U.S. PATENT DOCUMENTS

| | | | |
|---|---|---|---|
| 4,759,327 | 7/1988 | Nagano et al. | 123/436 |
| 4,876,995 | 10/1989 | Otobe et al. | 123/90.16 |
| 4,917,057 | 4/1990 | Seki | 123/90.16 |
| 4,942,853 | 7/1990 | Konno | 123/90.16 |
| 4,960,083 | 10/1990 | Seki et al. | 123/90.16 |
| 4,962,732 | 10/1990 | Inoue et al. | 123/90.16 |
| 4,996,954 | 3/1991 | Seki et al. | 123/90.16 |
| 5,009,203 | 4/1991 | Seki | 123/90.15 |
| 5,024,191 | 6/1991 | Nagahiro et al. | 123/90.16 |
| 5,060,604 | 10/1991 | Seki et al. | 123/90.16 |

FOREIGN PATENT DOCUMENTS

| | | |
|---|---|---|
| 63-167016 | 7/1988 | Japan . |
| 2-102310 | 4/1990 | Japan . |
| 2-102311 | 4/1990 | Japan . |
| 2-207110 | 8/1990 | Japan . |
| 2-207111 | 8/1990 | Japan . |
| 2-207112 | 8/1990 | Japan . |
| 2-221611 | 9/1990 | Japan . |
| 2-221615 | 9/1990 | Japan . |

Primary Examiner—E. Rollins Cross
Assistant Examiner—Weilun Lo
Attorney, Agent, or Firm—Foley & Lardner

[57] ABSTRACT

A variable cam engine wherein each cylinder has at least one valve driven by a multiplicity of cams which give different engine torque outputs. The engine includes a decision-making device which decides change-over of the cams along with a selection of a target cam according to the engine running conditions, a cam change-over mechanism which disengages a current cam from the valve and engages the target cam instead, a measuring device to measure engine parameters having a correlation with the cam change-over, a determining device to determine that a cam change-over has occurred by comparing these parameters with previously set values, and a regulating device which regulates combustion in the corresponding cylinder according to the cam change-over determined by the determining device. The fuel supply quantity and ignition period corresponding to the cam which is actually selected are thereby regulated for each cylinder, a torque step due to the cam change-over is avoided so that the change-over takes place smoothly, and degradation of the exhaust gas composition is prevented.

3 Claims, 11 Drawing Sheets

FIG. 7(A)

Economy cam | Power cam

Intake pressure (Negative)

Predetermined value ⇧ Decision

FIG. 7(B)

Compression pressure

Predetermined value ⇧ Decision

FIG. 7(C)

Hydraulic pressure in actuator (Negative)

Predetermined value ⇧ Decision

FIG. 7(D)

Torque for driving cams

Predetermined value ⇧ Decision

Output of cam change-over signal

VARIABLE CAM ENGINE

FIELD OF THE INVENTION

This invention relates to an engine wherein the characteristics of the cams driving the air intake and exhaust valves can be selected according to the running condition of the engine, and more particularly, to a control system for controlling the engine power when a cam change-over is made.

BACKGROUND OF THE INVENTION

The optimum timing of the air intake and exhaust valves of an engine differ according to the running conditions of the engine. At high speed, for example, a large valve lift and a long valve opening period are required in order to obtain high torque, while at low speed, a comparatively small valve lift and short opening period are required. Due to these differences, the running conditions of engines such as car engines vary widely. It was therefore impossible to design a valve drive cam which gives optimum performance for all running conditions.

In Tokkai Sho 63-167016 (Koho) published by the Japanese Patent Office, a variable cam engine is proposed wherein several cams with different shapes are provided, and the optimum valve timing is obtained by selecting these cams depending on the engine running conditions.

In such a variable cam engine, high torque output is obtained from low to high speed by providing a low speed power cam which gives high torque at low speed and a high speed power cam which gives high torque at high speed, and changing over between the two depending on the engine speed. In addition, an economy cam which has a still smaller valve lift and shorter opening period than the low speed power cam has also been proposed to improve fuel cost performance of engines on partial load.

Conventionally, the change-over between these cams was made by simultaneously driving cam selection actuators provided for each cylinder of the engine.

A certain time was, however, required from the time when a cam change-over command was issued until the time when the change-over was actually completed, and as there were some cases when a change-over could not be made depending on the range of crankshaft angular positions, cam change-over was not necessarily completed at the same time for all the cylinders.

It was therefore difficult to specify precisely which cam was being used for each cylinder immediately after issuing a change-over command.

When a cam change-over is made, the air charging efficiency of a cylinder varies according to the cam characteristics even if the throttle opening does not change, so the required fuel quantity and ignition period also vary.

If therefore, it is not possible to specify precisely which cam is being used as described heretofore, it is also impossible to control the fuel supply quantity and ignition period to be optimum values. This lack of optimum control produces a torque shock after making a change-over and adversely affects the composition of the exhaust gas.

SUMMARY OF THE INVENTION

It is therefore an object of the invention to avoid the occurrence of a torque shock and degradation of exhaust gas composition due to cam change-over by determining which cam is actually being used at any particular time, and regulating the combustion of each cylinder of the engine with a suitable timing.

It is a further object to evaluate the effect of a cam change-over by measuring engine parameters having a close correlation with the change-over, thereby avoiding the need for any special sensor to detect the change-over, which results in higher equipment cost.

To achieve the above objects, this invention provides a variable cam engine wherein each cylinder has at least one valve driven by a multiplicity of cams which give different engine torque outputs, comprising decision-making means which decides change-over of said cams along with a selection of a target cam according to the engine running conditions, a cam change-over mechanism which disengages a current cam from the valve and engages the target cam instead, measuring means to measure engine parameters having a correlation with the cam change-over, determining means to determine that a cam change-over has occurred by comparing these parameters with previously set values, and regulating means which regulates combustion in the corresponding cylinder according to the cam change-over determined by the determining means.

The measuring means may, for example, comprise sensors indicative of air intake pressure, compression pressure inside the cylinders, hydraulic pressure of the actuator which performs cam change-over, and drive torque of the camshaft.

The regulating means may, for example, comprise a mechanism which regulates the fuel supply quantity and the ignition period.

BRIEF DESCRIPTION OF THE DRAWINGS

FIGS. 7(a)–7(d) are graphs illustrating the characteristics of the engine parameters having a correlation with cam change-over according to this invention.

DESCRIPTION OF THE PREFERRED EMBODIMENTS

Figure 1:
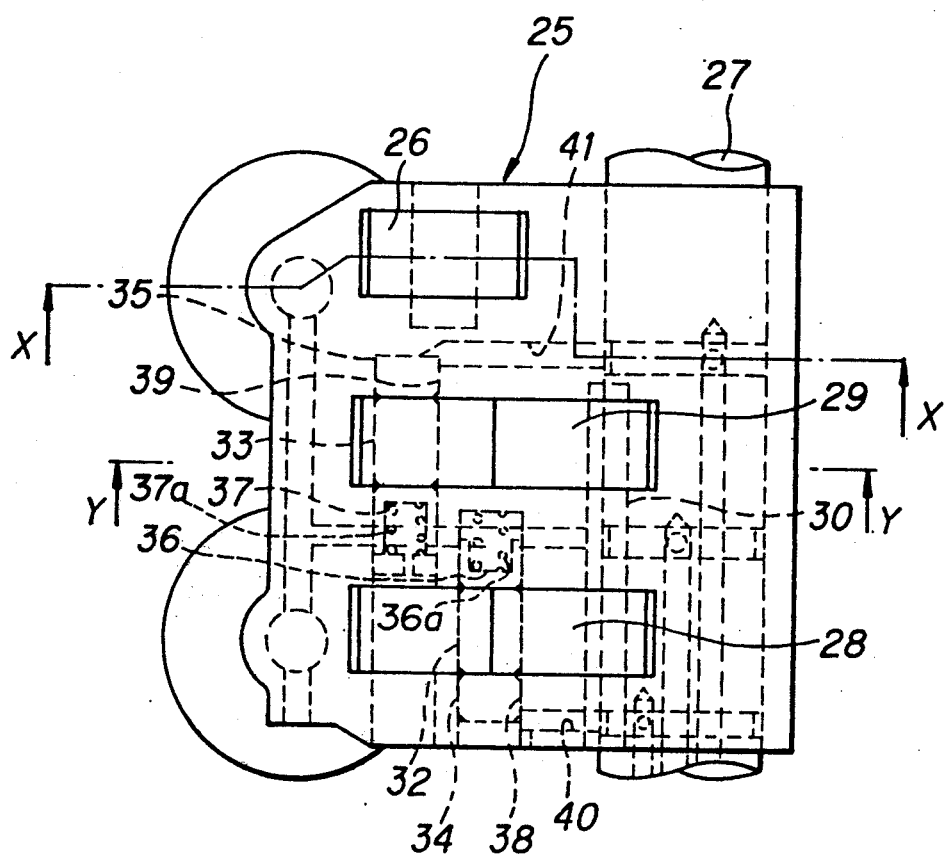
FIG. 1 is a plan view of a cam selecting mechanism of a variable cam engine with a power control mechanism according to this invention.
Figure 2:
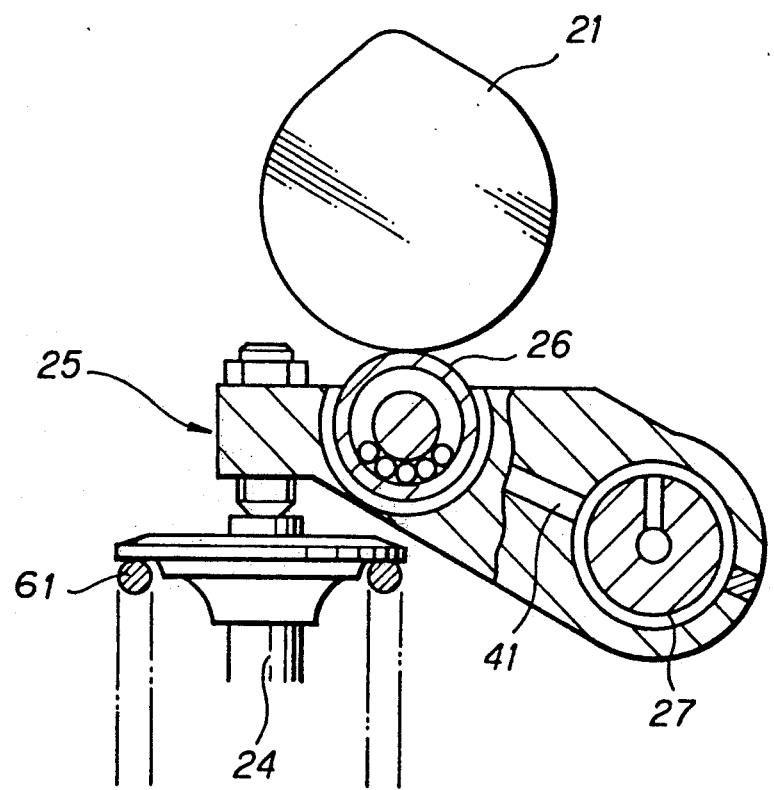
FIG. 2 shows a section through the line X—X in FIG. 1.
Figure 3:
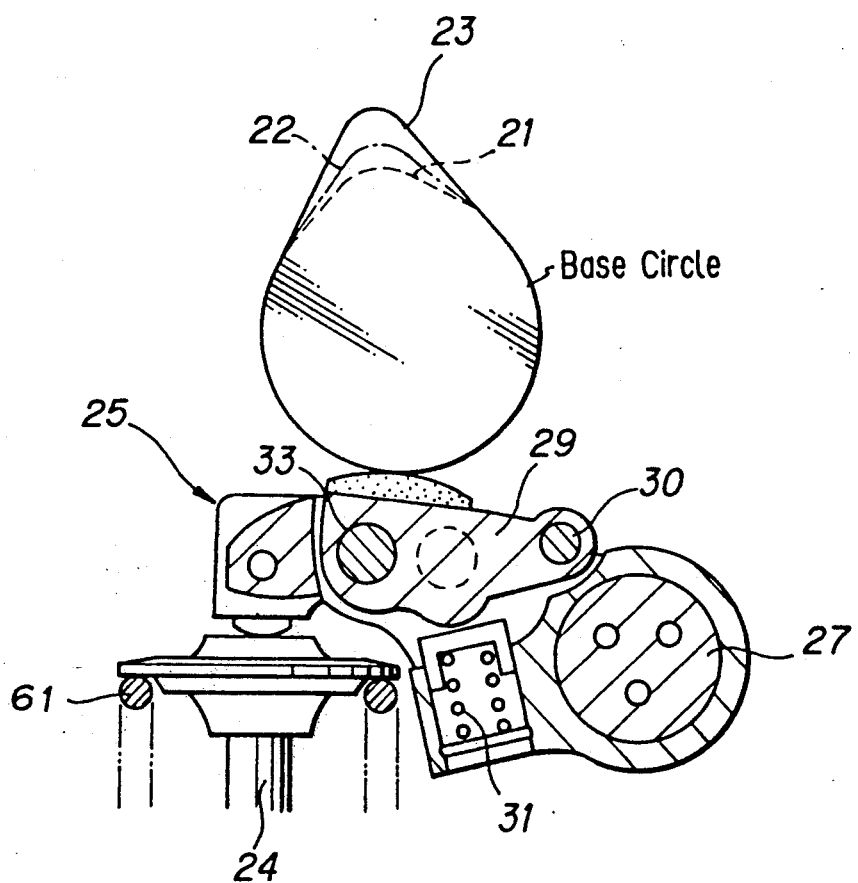
FIG. 3 shows a section through the line Y—Y in FIG. 1.

FIGS. 1, 2 and 3 show the structure of the cam selecting mechanism.

A first cam 21 (economy cam) has a shape which gives both a small cam lift amount and short lift period, and is set such that it gives good fuel cost performance on partial load.

A second cam 22 (low speed power cam) has a shape which gives a larger cam lift amount and longer lift period than the first cam 21, and is set such that it generates a large torque at low speeds.

A third cam 23 (high speed power cam) has a shape which gives a still higher lift amount and longer lift period than the second cam 22, and is set such that it generates a large torque at high speeds.

Figure 4:
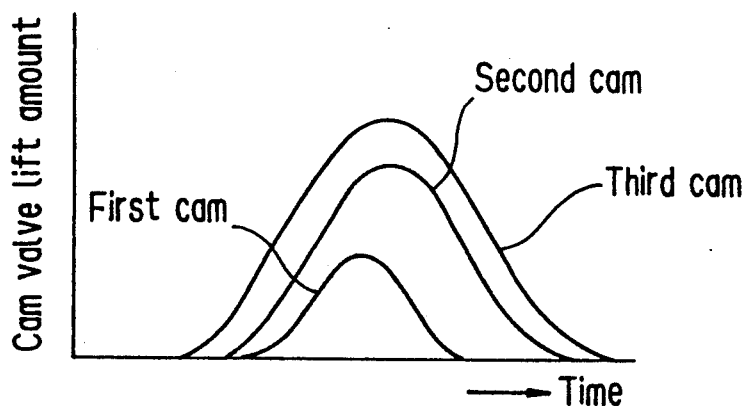
FIG. 4 is a graph illustrating the cam lift characteristics of the variable cam engine with the power control mechanism according to this invention.

The lift characteristics of these cams 21-23 are shown in FIG. 4. The base circle positions of cams 21-23 which are shown in FIG. 3 represent the non-lift intervals of these cams.

These cams 21, 22, 23 are arranged in series on the same cam shaft, not shown, and rotate together in synchronism with the engine revolution.

An air intake valve 24 is elastically supported in a closed position by a spring 61, and opened and closed by a main rocker arm 25 which pivots about a rocker shaft 27 supported by the engine cylinder head.

A roller 26 is attached to the main rocker arm 25 such that it can rotate freely. As shown in FIG. 2, the first cam 21 is in contact with this roller 26 and pushes the main rocker arm 25 down according to its rotation position to open the valve 24 against the force of the spring 61.

Two parallel grooves are formed on one side of the roller 26 in the main rocker arm 25. In these grooves, two sub-rocker arms 28 and 29 are provided which pivot about a common shaft 30 that is supported by the main rocker arm 25.

The sub-rocker arm 29 is supported such that it is in contact with the third cam 23 by a spring 31 inserted between the sub-rocker arm 29 and the main rocker arm 25 as shown in FIG. 3. Similarly, the sub-rocker arm 28 is supported such that it is in contact with the second cam 22 under the force of another spring. The sub-rocker arms 29 and 28 therefore pivot about the shaft 30 according to the rotation of the cams 23 and 22 respectively.

A cylindrical pin 33 is inserted in a channel running horizontally through the sub-rocker arm 29 such that it is free to slide on the inside of the channel. A hydraulic chamber 39 of the same cross-section as this channel opens onto the inside of the groove in the main rocker arm 25 which accommodates the sub-rocker arm 29, and another pin 35 of the same cross-section as the pin 33 is free to slide on the inner surface of the chamber 39. The pins 33 and 35 are positioned coaxially in the base circle position of the third cam 23 corresponding to its non-lift position shown in FIG. 3.

A hole of the same cross-section as the aforesaid channel and the hydraulic chamber 39 of the sub-rocker arm 29 is provided in the wall opposite the hydraulic chamber 39 of the groove housing the sub-rocker arm 29. A plunger 37 is inserted in this hole under the force of a return spring 37a.

When there is no pressurized oil acting on the hydraulic chamber 39, the pins 33 and 35 are pushed by the plunger 37 which is under the force of the return spring 37a so that they are held respectively in the channel of the sub-rocker arm 29 and the hydraulic chamber 39. In this state, the sub-rocker arm 29 can pivot freely with respect to the main rocker arm 25 according to the rotation of the third cam 23.

When pressurized oil is led through a passage 41 into the hydraulic chamber 39 in the base circle position of the third cam 23, the pins 35 and 33 which are positioned coaxially are pushed out by a predetermined distance against the force of the return spring 37a. Part of the pin 35 then enters the channel in the sub-rocker arm 29 and part of the pin 33 enters the hole in the main rocker arm housing the plunger 37 causing the sub-rocker arm 29 to engage with the main rocker arm 25.

Similarly, the sub-rocker arm 28 is caused to engage selectively with the main rocker arm 25 by means of an engaging mechanism which comprises pins 32 and 34, a return spring 36a, a plunger 36, a hydraulic chamber 38 and a passage 40.

When the sub-rocker arm 29 is engaged with the main rocker arm 25, the valve 24 opens and closes according to the motion of the third cam 23.

When the sub-rocker arm 29 is not engaged with the main rocker arm 25 and the sub-rocker arm 28 is engaged with the main rocker arm 25, the valve 24 opens and closes according to the motion of the second cam 22. When neither of the sub-rocker arms 28 and 29 are engaged with the main rocker arm 25, the valve 24 opens and closes according to the motion of the first cam 21.

In all cases, when the cams 21-23 are in the base circle position as shown in FIGS. 2 and 3, the main rocker arm 25, and the sub-rocker arms 28 and 29 are all in the non-lift position so that the air intake valve 24 is closed. Change-overs between the cams 21-23 are made during this non-lift interval.

Figure 5:
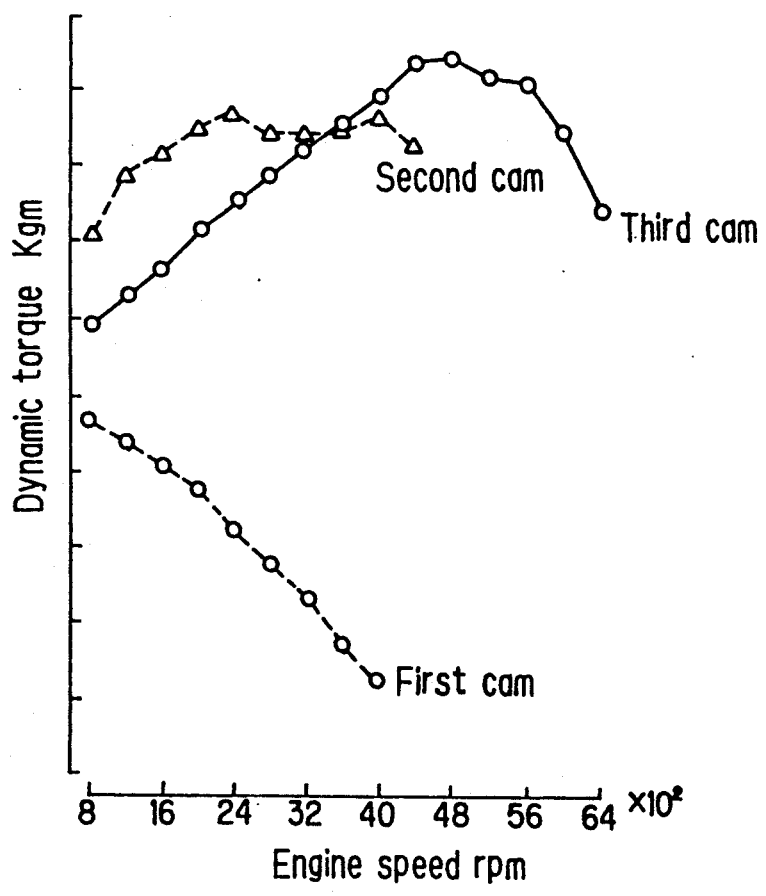
FIG. 5 is a graph illustrating the output characteristics on full throttle of the variable cam engine with the power control mechanism according to this invention.

FIG. 5 shows the torque characteristics of the cams 21-23 at full throttle. The first cam 21 generates a small torque over the whole range of speeds but it gives good fuel cost performance. The second cam 22 generates its maximum torque in the low speed region, while the third cam 23 generates its maximum torque in the high speed region.

Figure 6:
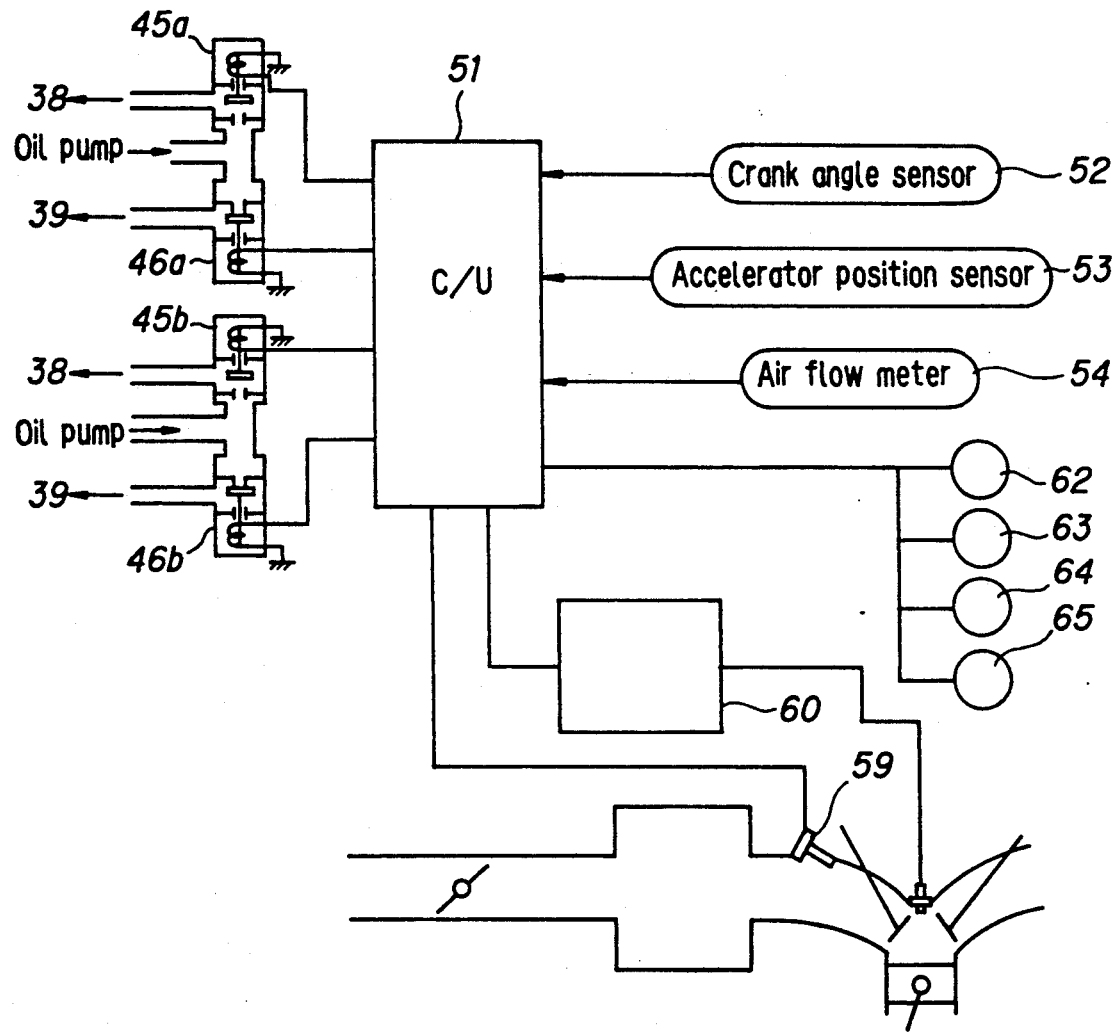
FIG. 6 is a schematic diagram of the power control mechanism according to this invention.

The change-overs between the cams 21, 22 and 23 are performed by a control unit 51 as shown in FIG. 6.

The control unit 51 is provided with a control map shown in FIG. 5 which sets the regions in which change-overs between the cams 21-23 are to be made, and it controls cam change-overs according to the running condition of the engine. The control unit 51 is supplied with signals indicative of crankshaft angle from a crank angle sensor 52, accelerator depression amount from an accelerator position sensor 53 and air flow volume from an air flow sensor 54. The control unit 51 selects the cams 21-23 as follows based upon these signals.

If the required torque indicated by the signal from the accelerator depression sensor 53 and the engine speed obtained from the signal from the crank angle sensor 52 are in the region of the first cam 21, i.e. the economy cam, this cam 21 is selected.

If the accelerator depression is then increased so that the required torque shifts to the region of the second cam 22, i.e. the low speed power cam, this cam 22 is selected.

If the engine rotation speed then increases from low speed to high speed, the third cam 23, i.e. the high speed power cam, is selected.

In this embodiment, the engine has four cylinders and each of these cylinders is equipped with these cams 21-23 and the cam change-over mechanism. The cam change-overs on all of the cylinders are controlled by the control unit 51 via solenoid valves 45a, 45b, 46a and 46b.

Cams provided for two of the cylinders in this four cylinder engine are changed over simultaneously by the opening and closing of the solenoid valves 45a and 46a, whereas cams provided for the other two cylinders are changed over simultaneously by the opening and closing of the solenoid valves 45b and 46b.

When, for example, the solenoid valve 45a is opened, pressurized oil is led from the oil pump to the hydraulic chamber 38 so as to cause the sub-rocker arm 28 to engage with the main rocker arm 25. When on the other hand the solenoid valve 46a is opened, pressurized oil is led from the oil pump to the hydraulic chamber 39 so as to cause the sub-rocker arm 29 to engage with the main rocker arm 25. The cams 21-23 are selected depending on these engaged positions as described hereintofore. Similarly, the cams for the other two cylinders are selected by the opening and closing of the solenoid valves 45b and 46b.

However, even if the throttle opening and engine revolution speed do not vary after making a cam change-over from the economy cam to a power cam, the air charging efficiency of a cylinder is almost twice as large and the air intake volume in the cylinder increases instantaneously. If the fuel supply quantity is not increased accordingly, the fuel quantity will be sufficient, and combustion may be adversely affected or ignition may fail. Further, the required ignition period also varies accordingly, and the variation in the required values is particularly great immediately after making the cam change-over.

The control unit 51 therefore detects a cam change-over, and corrects the fuel supply quantity and ignition period accordingly.

The control unit 51 is supplied with one or more signals from an air intake pressure sensor 62 for detecting the negative pressure of an air intake manifold, a cylinder pressure sensor 63 for detecting the pressure in a cylinder, a hydraulic pressure sensor 64 for detecting the hydraulic pressure acting on the oil chambers 38 and 39, and a torque sensor 65 for detecting the drive torque of a camshaft.

The control unit 51 stores a pattern indicative of the changes of these parameters due to a cam change-over, and determines whether there has actually been a cam change-over by comparing detected parameters with this pattern.

FIGS. 7(A)-D show the variation patterns of negative intake pressure, internal cylinder compression pressure, actuator hydraulic pressure and camshaft drive torque when a cam change-over is performed. The negative intake pressure is greater when a cylinder for which cam change-over has been completed moves on to its air intake process. The internal cylinder pressure also increases after a cam change-over has been completed. The hydraulic pressures of oil chambers 38 and 39 respectively increase when the solenoid valves 45a (45b) and 46a (46b) open, fall temporarily due to the enlargement of the oil chambers 38 and 39 when the pins 34 and 35 move, and then increase again. Further, the camshaft drive torque also increases relatively when there is a change-over to a power cam which has a large lift amount.

As shown by the arrows in FIG. 7, therefore, a cam change-over can be determined by measuring the variation pattern of the aforesaid parameters at specific positions, and comparing the measurements with set values which have been previously stored in the control unit 51.

These set values vary with the engine load and the engine revolution speed, so several types of values are stored by the control unit 51 according to engine load and revolution speed.

Figure 8A:
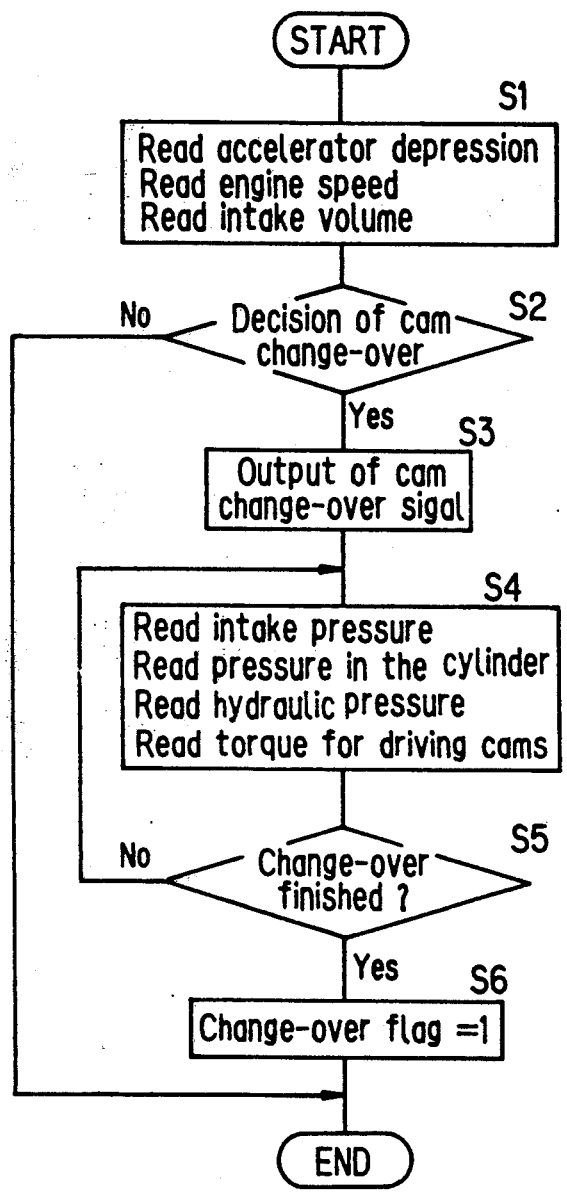
FIGS. 8a and 8b are flowcharts describing a control process of the power control mechanism according to this invention.

FIG. 8a is a routine for determining a cam change-over. First, in a step S1, the accelerator depression, engine revolution speed and air intake volume are entered as typical engine running parameters. In a step S2, these parameters are compared with an internal control map and patterns, and the need for performing a cam change-over is evaluated.

If a cam change-over is required, a cam change-over signal is output in a step S3. Next, at least one of the engine parameters of negative intake pressure, internal cylinder compression pressure, actuator hydraulic pressure and camshaft drive torque, is entered.

In a step S5, these parameters are compared with a pattern previously set according to the engine load and revolution speed at that time, and it is determined whether a cam change-over has actually occurred. If a change-over has occurred, a change-over flag is set to 1 in a step S6 and the determination of change-over is complete.

Figure 8B:
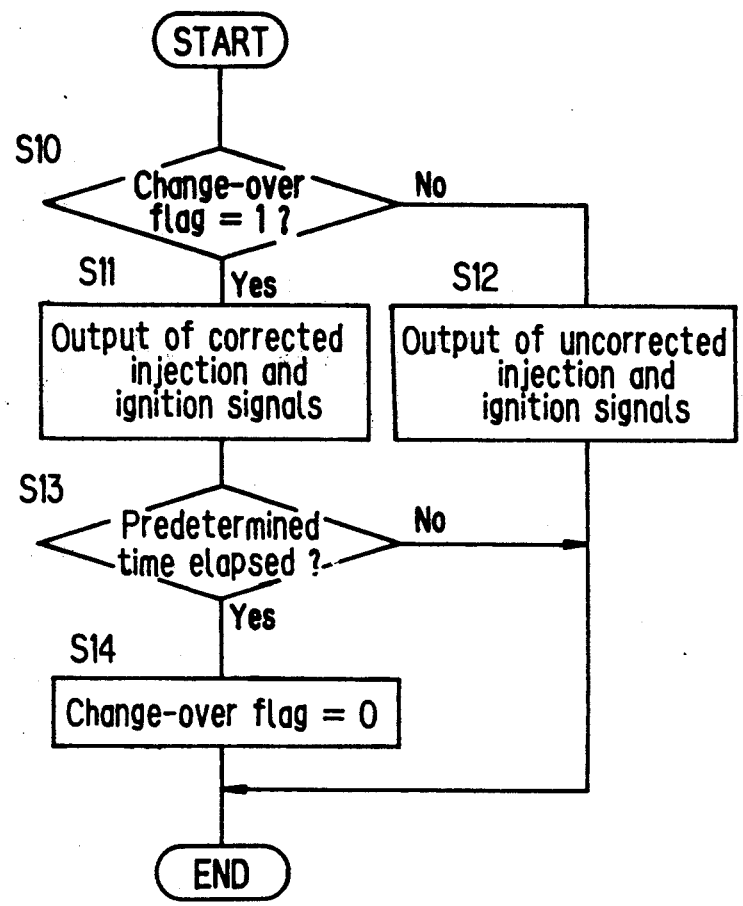

FIG. 8b is a routine for correcting fuel supply and ignition period accompanying cam change-over. First, in a step S10, it is determined whether or not the cam change-over flag is equal to 1. If it is equal to 1, a corrected fuel injection signal and a corrected ignition period signal corresponding to the target cam after change-over are output in a step S11. If on the other hand the change-over flag is not equal to 1, the same fuel injection signal and ignition period signal are output without performing a correction in a step S12.

If corrected signals are output, it is determined in a step S13 whether or not a predetermined time has elapsed after the cam change-over. If the predetermined time has elapsed, the change-over flag is reset to 0.

Figure 9:
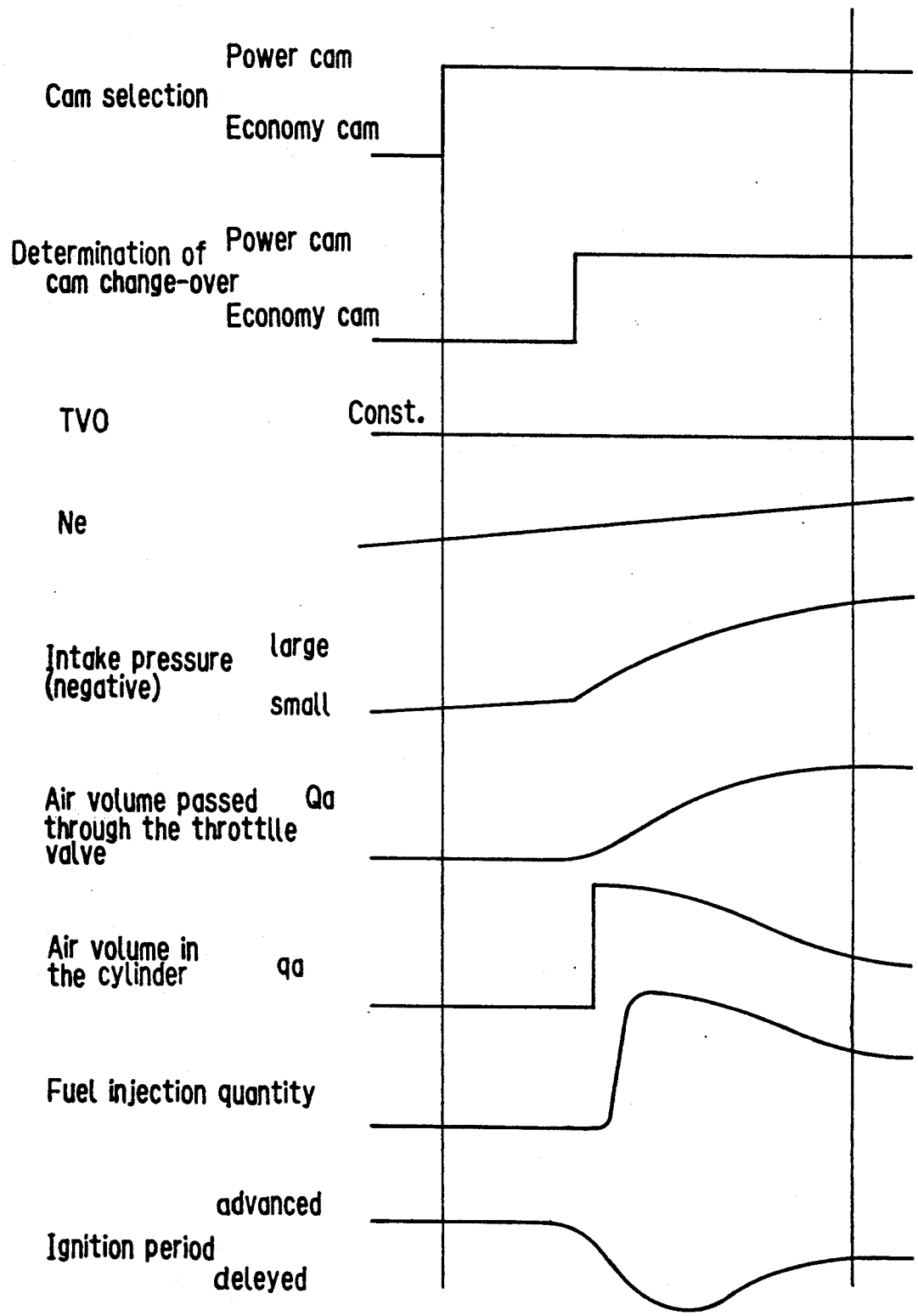
FIG. 9 is a timing chart illustrating how the fuel injection quantity and ignition period are corrected by the power control mechanism according to this invention.

FIG. 9 shows the effect of the corrections applied to fuel supply quantity and ignition period when a change-over is made from the first cam 21 to the second cam 22 or the third cam 23. The control unit 51 outputs correction signals at the same time as a cam change-over is confirmed, and the torque fluctuation due to the cam change-over is controlled with good timing by correcting the quantity of fuel supplied to a fuel injection valve 59 and the ignition period of an igniter 60.

The calculation of fuel injection quantity is made such that a basic value equivalent to the fuel injection quantity for the first cam 21 is computed based on the throttle air volume Qa detected by the air flow sensor 54 and the engine revolution speed Ne detected by the crank angle sensor 52, and the increased quantity required by the second cam 22 and the third cam 23 are computed based on the difference between the throttle air volume and the cylinder intake air volume qa.

The fuel supply quantity can be controlled based on the negative intake pressure and the engine revolution speed or the throttle opening and the engine revolution speed, if various maps related to these parameters are prepared according to the cam characteristics and the computation is performed based on these maps.

Figure 10:
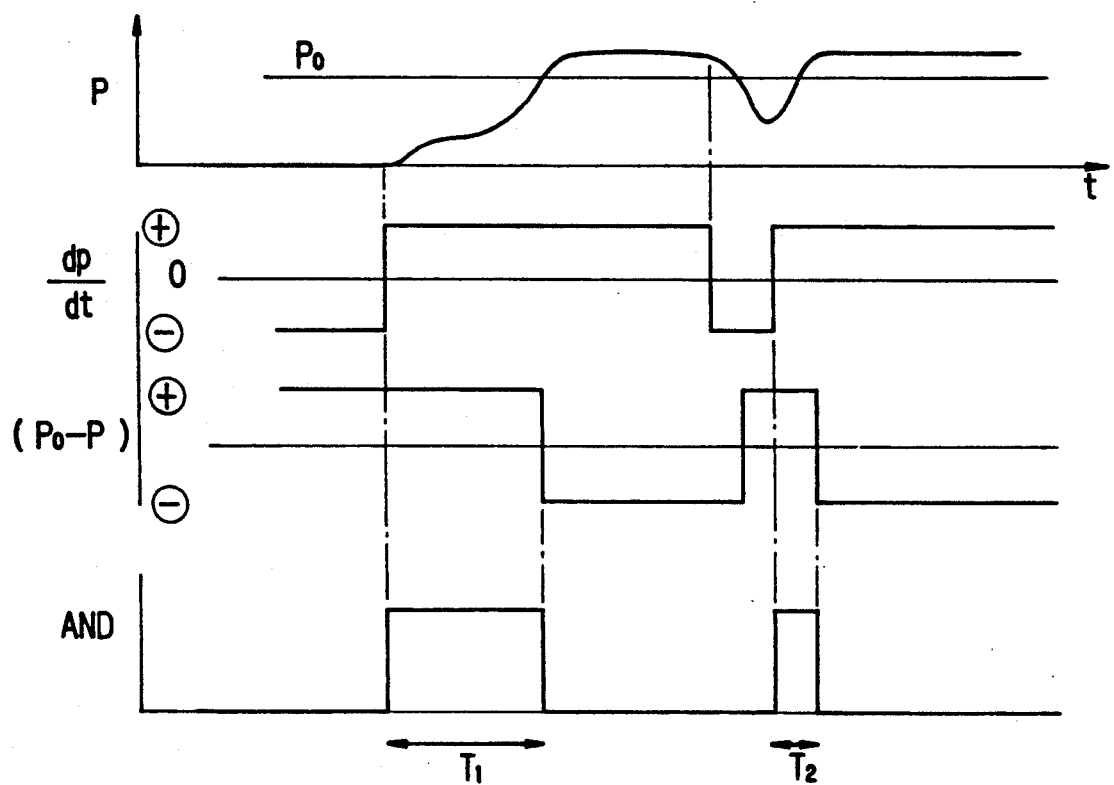
FIG. 10 is a graph illustrating the variation of actuator hydraulic pressure when a cam change-over is performed.
Figure 11:
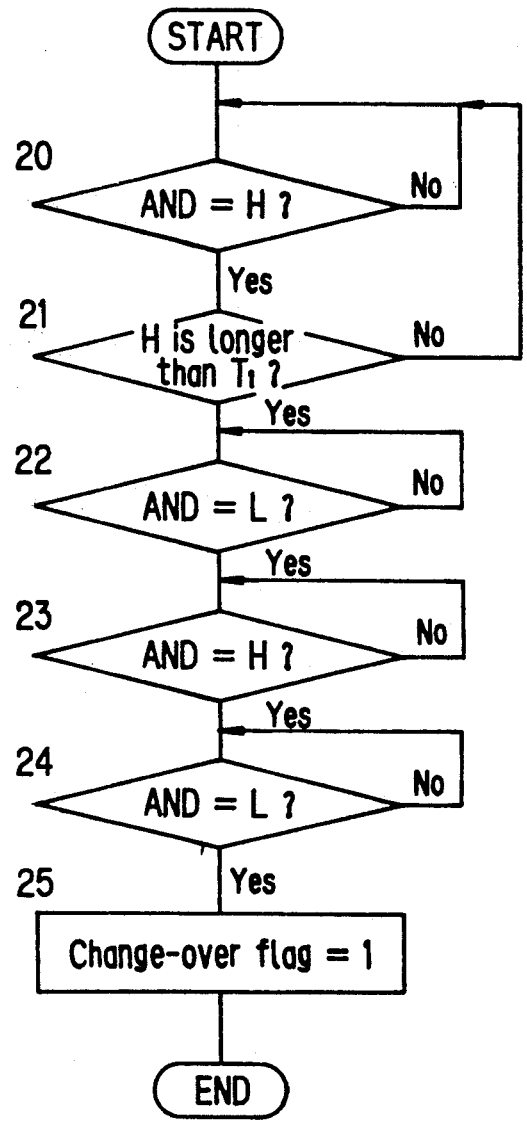
FIG. 11 is a flowchart illustrating another embodiment of the power control mechanism according to this invention.

FIG. 10 and 11 show another method of determining whether a cam change-over has occurred based on the actuator hydraulic pressure. The actuator hydraulic pressure, as described hereintofore, increases to a predetermined value when the solenoid valves 45a–46b are changed over due to a cam change-over, falls temporarily due to the motion of the pin 34 (35), and then stabilizes at a predetermined value.

To determine a cam change-over from these events, it is determined whether the hydraulic pressure P is rising or falling by finding its differential as shown in FIG. 10, and the difference of this pressure P from a set value Po is also computed. The logical product (AND) of $dp/dt > 0$ and $Po > 0$ is then found.

As shown in FIG. 11, in a step S20, it is determined whether or not this logical product is high level (AND=H). If it is high level, it is determined in a step S21 whether or not the high level condition continues for longer than a first predetermined time T1. If the high level condition does not continue longer than T1, it is regarded as noise and the system returns to the start level.

If the high level condition continues longer than T1, when it is detected in steps S22–S25 that the logical product changes to low level (AND=L), then to high level (corresponding to a time T2) and again to low level, the cam change-over is deemed to have been completed and the aforesaid flag is set equal to 1.

Thus, cam change-over can be determined from the actuator hydraulic pressure.

By detecting the cam change-over and correcting the fuel supply quantity and ignition period as described above, the torque variation due the change-over can be controlled, a torque shock can be avoided, and degradation of the exhaust gas composition can be prevented.

Further, as shown in FIG. 9, when there is a change-over from the economy cam to a power cam, the intake air volume in succeeding air intakes is less than it is in the first air intake immediately after the change-over. This is due to the fact that immediately after the change-over the negative intake pressure in the intake manifold is relatively weak and air volume aspirated into the cylinder according to the characteristics of the power cam temporarily becomes extremely large. Subsequently, due to the increase of the negative intake pressure, the air volume actually aspirated into the cylinder declines.

The corrections of fuel supply quantity and ignition period are therefore also greatest immediately after a cam change-over, and a return can subsequently be made to the normal fuel supply quantity and ignition period corresponding to the new cam according to the measured air intake volume and engine revolution speed.

Further, according to the above embodiment, both the fuel consumption quantity and ignition period are corrected after making the cam change-over, but even if only one of these parameters is corrected it will improve driving performance of the vehicle and the exhaust gas composition.

The foregoing description of a preferred embodiment for the purpose of illustrating this invention is not to be considered as limiting or restricting the invention, since many modifications, including application of this invention to exhaust valves, may be made by those skilled in the art without departing from the scope of the invention.

The embodiments of this invention in which an exclusive property or privilege is claimed are defined as follows:

1. A variable cam engine wherein each cylinder has at least one valve driven by a plurality of cams formed on a camshaft and giving different engine torque outputs, comprising:
   decision-making means for deciding a change-over of said cams and for selecting a target cam according to the engine running conditions;
   a cam change-over mechanism which disengages a current cam from said valve and engages said target cam instead;
   a torque sensor which detects a camshaft drive torque;
   determining means for determining whether said cam change-over has occurred by comparing said camshaft drive torque with previously set values of camshaft drive torque; and
   regulating means for regulating combustion in each cylinder according to said cam change-over determined by said determining means.

2. A variable cam engine as defined in claim 1, wherein said regulating means is a fuel supply quantity correction mechanism.

3. A variable cam engine as defined in claim 1, wherein said regulating means is an ignition period correction mechanism.

* * * * *